United States Patent
Calvo et al.

(10) Patent No.: US 6,792,774 B2
(45) Date of Patent: Sep. 21, 2004

(54) METHOD OF TREATING GASEOUS WASTE FROM AN OPTICAL FIBER PREFORM FABRICATION UNIT

(75) Inventors: Laurent Calvo, Lille (FR); Cyril Gallardo, Lambersart (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/379,690

(22) Filed: Mar. 6, 2003

(65) Prior Publication Data

US 2003/0167794 A1 Sep. 11, 2003

(30) Foreign Application Priority Data

Mar. 7, 2002  (FR) .............................. 02 02899

(51) Int. Cl.⁷ .............................. F25J 1/00; B01J 8/04
(52) U.S. Cl. .......................... 62/606; 62/616; 422/190
(58) Field of Search .................... 62/606, 616, 617; 422/190

(56) References Cited

U.S. PATENT DOCUMENTS

| | | | | |
|---|---|---|---|---|
| 2,508,989 A | * | 5/1950 | Brandegee | 62/606 |
| 2,984,078 A | * | 5/1961 | Schmidt et al. | 62/606 |
| 3,410,099 A | * | 11/1968 | Hooker et al. | 62/606 |
| 4,578,253 A | | 3/1986 | Gill et al. | |
| 6,149,884 A | | 11/2000 | Appriou et al. | |
| 6,361,750 B2 | * | 3/2002 | Zhou et al. | 422/190 |
| 6,495,204 B1 | * | 12/2002 | Allen et al. | 427/220 |

FOREIGN PATENT DOCUMENTS

| | | | |
|---|---|---|---|
| DE | 3206145 A1 | | 9/1983 |
| JP | 10311674 A | * | 11/1998 |
| JP | 2002114534 A | * | 4/2002 |

* cited by examiner

Primary Examiner—William C. Doerrler
(74) Attorney, Agent, or Firm—Sughrue Mion, PLLC

(57) ABSTRACT

A method of treating gaseous waste from an optical fiber preform fabrication unit containing halogenated compounds includes a step of forming a liquid effluent from the gaseous waste by condensing the gaseous waste. The gaseous waste is preferably condensed by cooling it. Plant for implementing the method includes a condenser and a container for collecting condensate. The condenser is preferably a refrigerating device. The plant can further include a soot box.

7 Claims, 3 Drawing Sheets

METHOD OF TREATING GASEOUS WASTE FROM AN OPTICAL FIBER PREFORM FABRICATION UNIT

CROSS-REFERENCE TO RELATED APPLICATIONS

This application is based on French Patent Application No. 02 02899 filed Mar. 7, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method of fabricating an optical fiber preform that generates gaseous effluents containing halogenated compounds. The invention relates more particularly to treating the effluents in order to recover them or eliminate them. It also encompasses plant for implementing the method.

2. Description of the Prior Art

The chemical vapor deposition (CVD) process is used in the fabrication of preforms from which optical fibers are produced. A hollow silica tube is mounted on a glassmaker's lathe and a mixture of several gases is injected into it, the mixture including gaseous halogenated compounds such as silicon tetrachloride $SiCl_4$ and germanium tetrachloride $GeCl_4$. A torch sweeps the whole length of the tube, from one end to the other, first in one direction and then in the opposite direction, which represents one pass. Because of the effect of the temperature, the halogenides are oxidized, forming soot that is deposited on the internal walls of the tube and is finally vitrified. Several successive layers of glass are deposited on the inside of the tube in this way. The purpose of the first pass is to allow the temperatures of the various systems present to equalize. During this first pass, the gaseous halogenides are not directed into the tube, but are instead evacuated directly to an outlet. Halogenides are regarded as pollutants, and it is not acceptable to release them into the atmosphere. For ecological reasons, halogenides must therefore be eliminated or recovered. This is usually done by means of a soot box, which is a container adapted to collect the particles that are formed when the halogenides are brought into contact with ambient moist air. This deposition continues in the network of pipes. Lumps of solid particles are formed, which are in large part the cause of blocking of the pipes.

A method known from the document FR-2 522 278 is used to treat the gaseous waste to recover germanium. The method includes a step of passing the gaseous effluents into a washer. The effluent is therefore brought into contact with an aqueous solution. A solution is used that is sufficiently basic for the chlorides, and in particular germanium tetrachloride $GeCl_4$, to be trapped by hydrolysis. For cost reasons, the germanium is then recovered by adding to the aqueous medium a precipitation agent containing a multivalent cation. The document FR-2 773 724 proposes using magnesia MgO as the precipitation agent.

An object of the present invention is to propose a reduced maintenance optical fiber preform fabrication method. To be more specific, the invention proposes a method of treating gaseous waste that reduces the risk of blocking of the pipes and facilitates recycling of the effluents.

SUMMARY OF THE INVENTION

The present invention provides a method of treating gaseous waste from an optical fiber preform fabrication unit containing halogenated compounds, the method including a step of forming a liquid effluent from the gaseous waste by condensing the gaseous waste.

Condensation is preferably obtained by cooling. For example, condensation is effected by circulating the gaseous waste in a refrigerating device such as a heat exchanger. Condensation could instead be achieved by compression. After condensation, the liquid effluent is collected in a collector container and then treated.

The plant for implementing the method according to the invention includes a condenser and a container for collecting the condensate. The condenser is preferably a refrigerating device.

The plant preferably further includes a soot box. The soot box causes the residual chlorides to react by bringing them into contact with moisture. All along the fabrication line, and up to the point at which they enter the soot box, the chlorides are in contact only with dry gases. When they reach the soot box, they are mixed with moist ambient air and form solid particles. The function of the soot box is to provoke solidification and to collect the products thereof. Given the large volume of gas to be treated, the first pass constitutes a separate operation using the plant. A plurality of fabrication lines can therefore share the plant and operate simultaneously.

The present invention has the advantage of recovering a large proportion of the waste halogenides, and consequently of improving the recovery of germanium in particular. Apart from recycling the halogenated substances, reducing the volume of effluent passing through the soot box considerably reduces soiling of the pipes and therefore eliminates the problem of backflow caused by clogging of the network and reduces plant maintenance. Finally, it is no longer necessary to remove waste accumulating in the soot boxes, which reduces the production cost.

The invention will be more clearly understood and other advantages and features will become apparent on reading the following description, which is given by way of illustrative and non-limiting example, and is accompanied by the appended drawings.

DETAILED DESCRIPTION OF THE PREFERRED EMBODIMENTS

Figure 1:
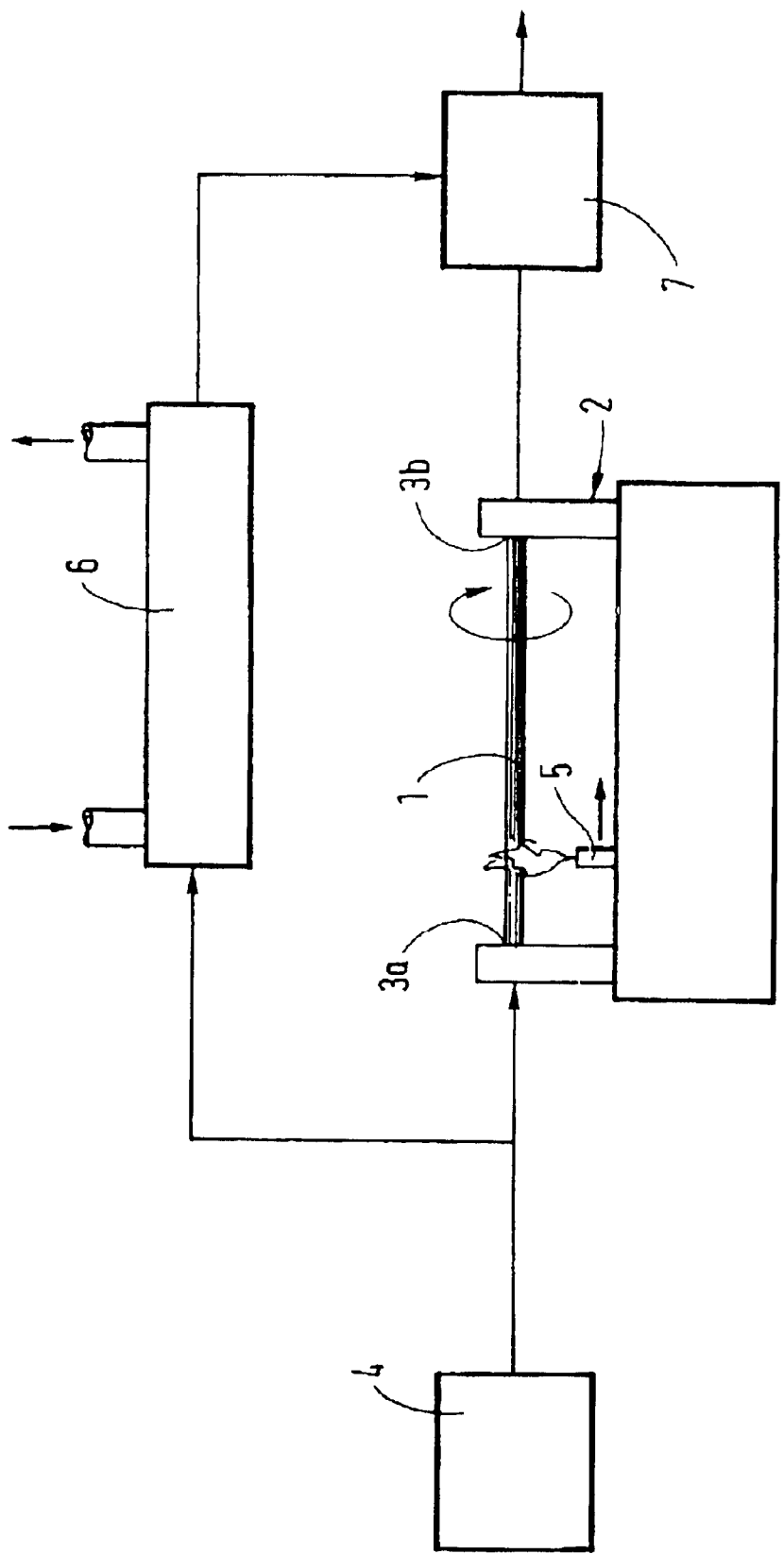
FIG. 1 is a diagram showing one embodiment of a CVD installation during the fabrication of an optical fiber preform.

FIG. 1 shows a hollow silica tube 1 fixed to a glassmaker's lathe 2 by its two ends 3a and 3b. A flow of gas 4 is directed into the interior of the tube. It enters at the end 3a and exits at the end 3b. The gaseous flow 4 comprises a mixture of several gases, and in particular chlorine-containing compounds such as silicon tetrachloride $SiCl_4$, germanium tetrachloride $GeCl_4$, and phosphorus oxychloride $POCl_3$. A torch 5 sweeps the whole length of the tube 1, which oxidizes the chlorides. The oxidized chlorides form soot that is deposited on the internal walls of the tube 1 and finally vitrified. A plurality of successive layers of glass are deposited on the inside of the tube in this way. During the first pass, to allow the temperatures of the various elements used to equalize, the halogenated gaseous flow is not directed into the tube, but instead to treatment plant 6, before passing through a soot box 7.

Figure 2:
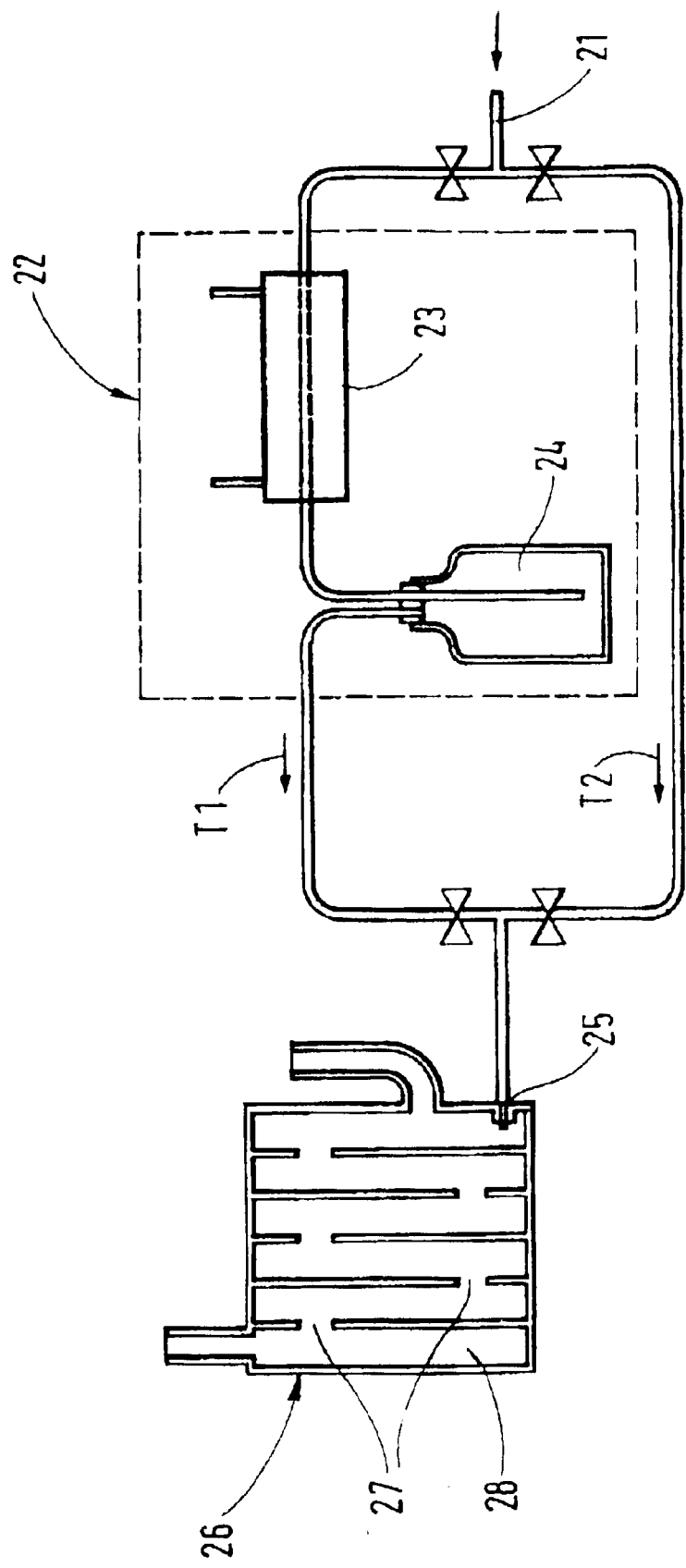
FIG. 2 is a diagram, for a different embodiment, showing a system for treating gaseous waste.

An inlet 21 for gaseous waste resulting from the fabrication of the preform is seen on the right-hand side of FIG. 2. During the first pass, during the equalization of the temperatures of the systems present, the gaseous waste contains a high concentration of halogenated compounds. The gaseous flow then takes a path T1 which passes through treatment plant 22 comprising a device 23 for condensing gases and a device 24 for collecting the liquid effluent resulting from condensation. The device 23 is a heat exchanger whose refrigerating fluid is water at a temperature of approximately 4° C., for example. The incoming gases are suddenly cooled and condensed to liquid form. The liquid flowing out of the exchanger 23 is collected in a collector container 24 in which the liquids accumulate for subsequent treatment.

During subsequent preform fabrication steps, the gaseous waste contains little or no halogenated compounds. To avoid entraining liquids condensed during the first pass, the gaseous waste from subsequent passes, which is free of halogenated compounds, takes a path T2, which does not include any treatment plant. The paths T1 and T2 join up to direct the gaseous residues that have not been condensed to the inlet 25 of a soot box 26 in which the residual chlorides are deposited. Until they enter the soot box, the chlorides are in contact only with dry gases. When they enter the soot box, they are mixed with moist ambient air and solidify. The soot box is designed to amplify this solidification. Chicanes 27 in the soot box encourage mixing of the moist air and the chlorides and a filling 28 between the chicanes 27 consists of plastics material rings that increase the surface area on which solid particles are formed.

Figure 3:
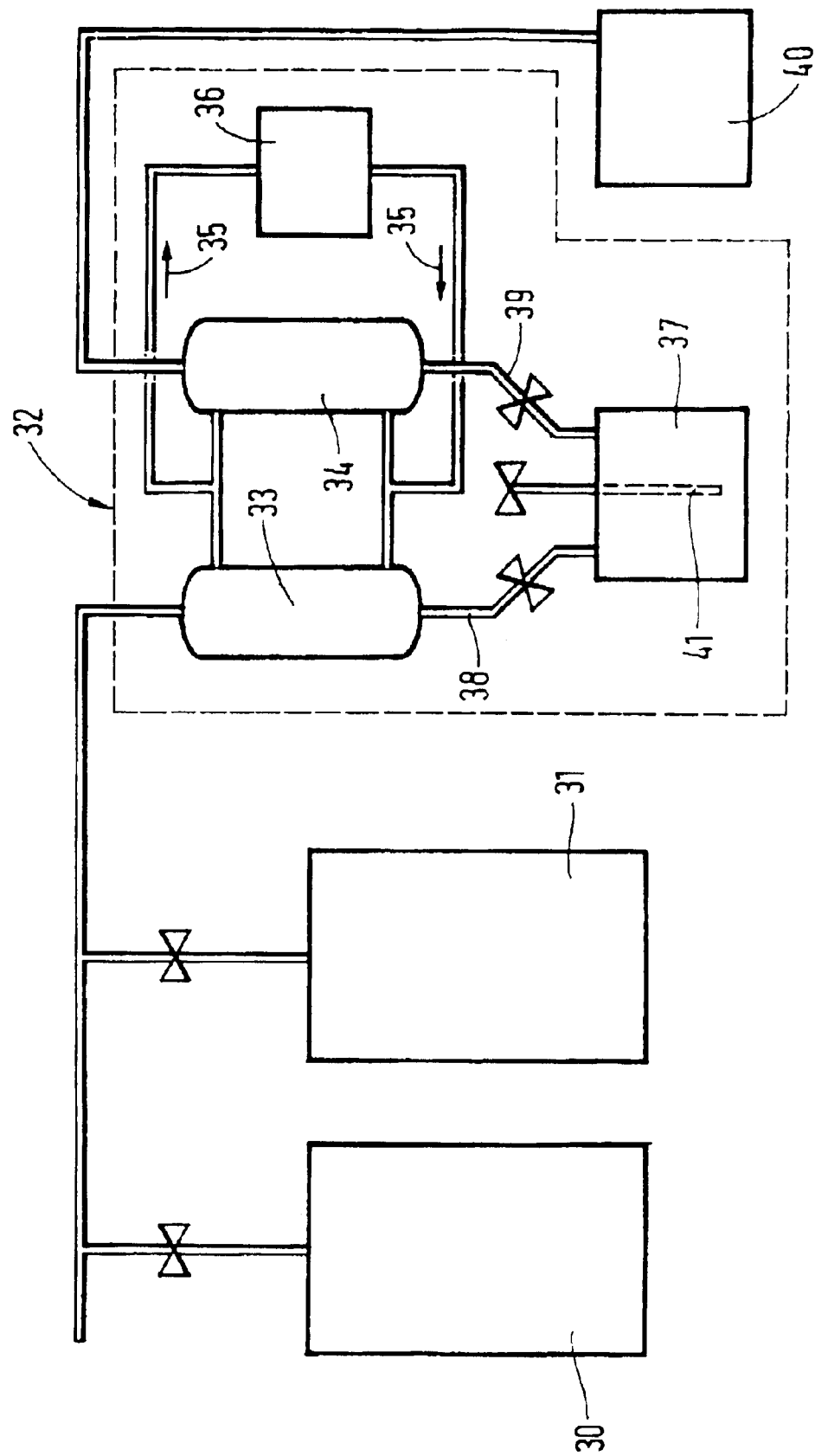
FIG. 3 is a diagram showing an installation comprising a system for treating gaseous waste common to CVD preform fabrication lines.

FIG. 3 shows an installation comprising two CVD lines 30 and 31 connected to treatment plant 32 common to the two lines 30 and 31. The installation could equally well include three or more CVD lines. The treatment plant 32 includes a first condenser 33 and a second condenser 34, both of which are refrigerated by circulating cold water 35 from a refrigerator unit 36. At the outlet of the first condenser 33, the liquid effluent obtained is collected in a collector container 37 via an inlet tube 38. The non-liquefied effluent passes through the container 37 and is directed into a second condenser 34 via an outlet tube 39. Gravity causes the condensed portion of the effluent to return to the container 37 via the tube 39. At the exit of the condenser 34, the residual and non-condensable effluent is directed to a soot box 40. The container 37 is drained into a container suitable for transporting this type of product without contact with air via a vertical pipe 41. The liquid effluent is then evacuated for recycling.

During the first pass, each fabrication line 30, 31 is connected to the processing plant 32 to condense the halogenides contained in the gaseous effluent. Plant analogous to that shown in FIG. 3 has successfully recovered almost 60% by weight of the waste halogenides in the condensed effluent.

What is claimed is:

1. A method of treating gaseous waste from an optical fiber preform fabrication unit containing halogenated compounds, said method including:

fabricating an optical fiber perform in a perform fabrication unit, wherein gaseous waste containing halogenated compounds is generated during said fabricating process;

passing only said gaseous waste to a treatment plant;

condensing said gaseous waste in a device in said treatment plant so as to form a liquid affluent; and collecting said liquid effluent.

2. The method claimed in claim 1, wherein said gaseous waste is condensed by cooling it.

3. The method claimed in claim 2, wherein said gaseous waste is condensed by circulating it in a refrigerating device.

4. The method claimed in claim 1, wherein said liquid effluent is collected in a container for further treatment.

5. A gaseous waste treatment plant adapted to implement the method claimed in claim 1 and including a condenser and a container for collecting condensate.

6. The plant claimed in claim 5, wherein said condenser is a refrigerating device.

7. The plant claimed in claim 5, including a soot box.

* * * * *